US011979479B1

(12) United States Patent
Lai et al.

(10) Patent No.: US 11,979,479 B1
(45) Date of Patent: May 7, 2024

(54) PACKET SORTING AND REASSEMBLY CIRCUIT MODULE

(71) Applicants: Chung Yuan Christian University, Taoyuan (TW); KGI Securities Co. Ltd., Taipei (TW)

(72) Inventors: Yu-Kuen Lai, Taoyuan (TW); Chao-Lin Wang, Taipei (TW); He-Ping Li, Taoyuan (TW); Cheng-Han Chuang, Taoyuan (TW); Kai-Po Chang, Taoyuan (TW)

(73) Assignees: Chung Yuan Christian University, Taoyuan (TW); KGI Securities Co. Ltd., Taipei (TW)

( * ) Notice: Subject to any disclaimer, the term of this patent is extended or adjusted under 35 U.S.C. 154(b) by 0 days.

(21) Appl. No.: 18/155,048

(22) Filed: Jan. 16, 2023

(30) Foreign Application Priority Data

Oct. 21, 2022 (TW) ................... 111140140

(51) Int. Cl.
*H04L 69/163* (2022.01)
*H04L 69/22* (2022.01)

(52) U.S. Cl.
CPC ............ *H04L 69/163* (2013.01); *H04L 69/22* (2013.01)

(58) Field of Classification Search
None
See application file for complete search history.

(56) References Cited

U.S. PATENT DOCUMENTS

| 7,126,952 B2 | 10/2006 | Hooper et al. |
| 2004/0049596 A1* | 3/2004 | Schuehler ............... H04L 69/16 709/231 |

(Continued)

FOREIGN PATENT DOCUMENTS

| CN | 101253745 | 6/2011 |
| TW | 202228428 | 7/2022 |

OTHER PUBLICATIONS

Yu-Kuen Lai et al., "The Design and Implementation of an FPGA-based Securities Risk Management System Using the Financial Information Exchange Protocol", English Abstract, Taiwan Academic Network Conference, Dec. 15, 2022, p. 1.

(Continued)

*Primary Examiner* — James A Edwards
(74) *Attorney, Agent, or Firm* — JCIPRNET

(57) ABSTRACT

A packet sorting and reassembly circuit module, including a header parser, an information processing circuit, at least one state tracking and reassembly circuit, and an output arbiter, is provided. The header parser is configured to analyze multiple first packet segments to obtain header information corresponding to a first network packet, wherein the first network packet is transmitted based on a transmission control protocol (TCP) communication protocol. The information processing circuit is configured to transmit the first packet segments and sideband information corresponding to the first packet segments to a first state tracking and reassembly circuit among the at least one state tracking and reassembly circuit according to the header information. The first state tracking and reassembly circuit is configured to reassemble and sort the first packet segments according to the sideband information. The output arbiter is configured to output the first packet segments according to a sorting result.

10 Claims, 8 Drawing Sheets

(56) References Cited

U.S. PATENT DOCUMENTS

| | | | | |
|---|---|---|---|---|
| 2008/0317025 | A1* | 12/2008 | Manula | H04Q 1/035 370/422 |
| 2015/0172226 | A1* | 6/2015 | Borshteen | H04L 49/9057 370/412 |
| 2016/0344629 | A1* | 11/2016 | Gray | H04L 49/106 |
| 2020/0328973 | A1 | 10/2020 | Makineni et al. | |

OTHER PUBLICATIONS

"Office Action of Taiwan Counterpart Application", dated Jun. 6, 2023, p. 1-p. 5.

* cited by examiner

Algorithm A  TCP packets sorted and sent out from client side to server

1: if pkt_seq ==client_seq and pkt_ack ==server_seq and pkt_ts≥client_ts then
2:     client_seq=pkt_seq
3:     client_ts=pkt_ts
4:     client_window_edge=server_seq+pkt_window_size
5:     send_out_the_packet( )
6: end if

Algorithm B  TCP packets sorted and sent out from server to client side

1: if pkt_seq ==server_seq and pkt_ack ==client_seq and pkt_ts≥server_ts then
2:     server_seq=pkt_seq
3:     server_ts=pkt_ts
4:     server_window_edge=client_seq+pkt_window_size
5:     send_out_the_packet( )
6: end if

Algorithm C  Retransmission packet sent out from client side to server

1: if client_seq>server_window_edge then
2:     if pkt_seq<=client_seq and pkt_seq>server_window_edge then
3:         send_out_the_packet_with_mark( )
4:     end if
5: else
6:     if pkt_seq<=client_seq and pkt_seq<=server_window_edge then
7:         send_out_the_packet_with_mark( )
8:     else if pkt_seq>client_seq and pkt_seq>server_window_edge then
9:         send_out_the_packet_with_mark( )
10:    end if
11: end if

Algorithm D  Retransmission packet sent out from server to client side

1: if server_seq>client_window_edge then
2:     if pkt_seq<=server_seq and pkt_seq>client_window_edge then
3:         send_out_the_packet_with_mark( )
4:     end if
5: else
6:     if pkt_seq<=server_seq and pkt_seq<=client_window_edge then
7:         send_out_the_packet_with_mark( )
8:     else if pkt_seq>server_seq and pkt_seq>client_window_edge then
9:         send_out_the_packet_with_mark( )
10:    end if
11: end if

FIG. 10

| Algorithm variable name | Description |
|---|---|
| client_seq | Sequence number of next packet of client side. Starting position of receiving window of server |
| client_ts | Time stamp of previous packet of client side |
| client_window_edge | End position of receiving window of client side |
| server_seq | Sequence number of next packet of server. Starting position of receiving window of client side |
| server_ts | Time stamp of previous packet of server |
| server_window_edge | End position of receiving window of server |
| pkt_seq | Sequence number of packet in temporary memory space |
| pkt_ts | Time stamp of packet in temporary memory space |
| pkt_window_edge | Window size of packet in temporary memory space |

FIG. 11

PACKET SORTING AND REASSEMBLY CIRCUIT MODULE

CROSS-REFERENCE TO RELATED APPLICATION

This application claims the priority benefit of Taiwan application serial no. 111140140, filed on Oct. 21, 2022. The entirety of the above-mentioned patent application is hereby incorporated by reference herein and made a part of this specification.

BACKGROUND

Technical Field

The disclosure relates to a packet sorting and reassembly circuit module.

Description of Related Art

During the process of high-speed packet transmission, it is often necessary to analyze the packet content to execute the measures required, such as system security protection. In addition, in the online risk-control system, it is also necessary to parse the content of the fast-transmitted high-frequency trading packets to prevent unexpected trading events and safeguard the interests of all parties. However, when a network packet is transmitted in the form of packet segments, out-of-sequence situations are prone to occur. If the received packet segments cannot be correctly sequenced and reassembled, the correct packet content cannot be read. Therefore, how to improve the sorting and reassembly efficiency of the network packet on the premise of maintaining the high-speed transmission of packets as much as possible is one of the topics that persons skilled in the art are devoted to research.

SUMMARY

The disclosure provides a packet sorting and reassembly circuit module, which can improve the sorting and reassembly efficiency of a network packet on the premise of maintaining the high-speed transmission of packets as much as possible.

An embodiment of the disclosure provides a packet sorting and reassembly circuit module, which includes a header parser, an information processing circuit, at least one state tracking and reassembly circuit, and an output arbiter. The information processing circuit is coupled to the header parser. The at least one state tracking and reassembly circuit is coupled to the information processing circuit. The output arbiter is coupled to the at least one state tracking and reassembly circuit. The header parser is configured to analyze multiple first packet segments to obtain header information corresponding to a first network packet. The first network packet is transmitted based on a transmission control protocol (TCP) communication protocol. The information processing circuit is configured to transmit the first packet segments and sideband information corresponding to the first packet segments to a first state tracking and reassembly circuit among the at least one state tracking and reassembly circuit according to the header information. The first state tracking and reassembly circuit is configured to reassemble and sort the first packet segments according to the sideband information. The output arbiter is configured to output the first packet segments according to a sorting result.

Based on the above, the packet sorting and reassembly circuit module provided in the embodiment of the disclosure can perform highly efficient reassembly and sort on the packet segments of the network packet transmitted based on the TCP communication protocol through the joint operation of the header parser, the information processing circuit, the state tracking and reassembly circuit, and the output arbiter implemented in the form of hardware. In this way, on the premise of maintaining the high-speed transmission of the packets as much as possible, the sorting and reassembly efficiency of the network packet can be improved to facilitate subsequent packet content retrieval.

BRIEF DESCRIPTION OF THE DRAWINGS

FIG. 10 shows pseudo codes of multiple algorithms for sorting, sending out, and retransmitting a network packet according to an embodiment of the disclosure.

FIG. 11 shows names and descriptions of variables adopted in the pseudo-codes of the algorithms shown in FIG. 10.

DETAILED DESCRIPTION OF DISCLOSED EMBODIMENTS

Figure 1:
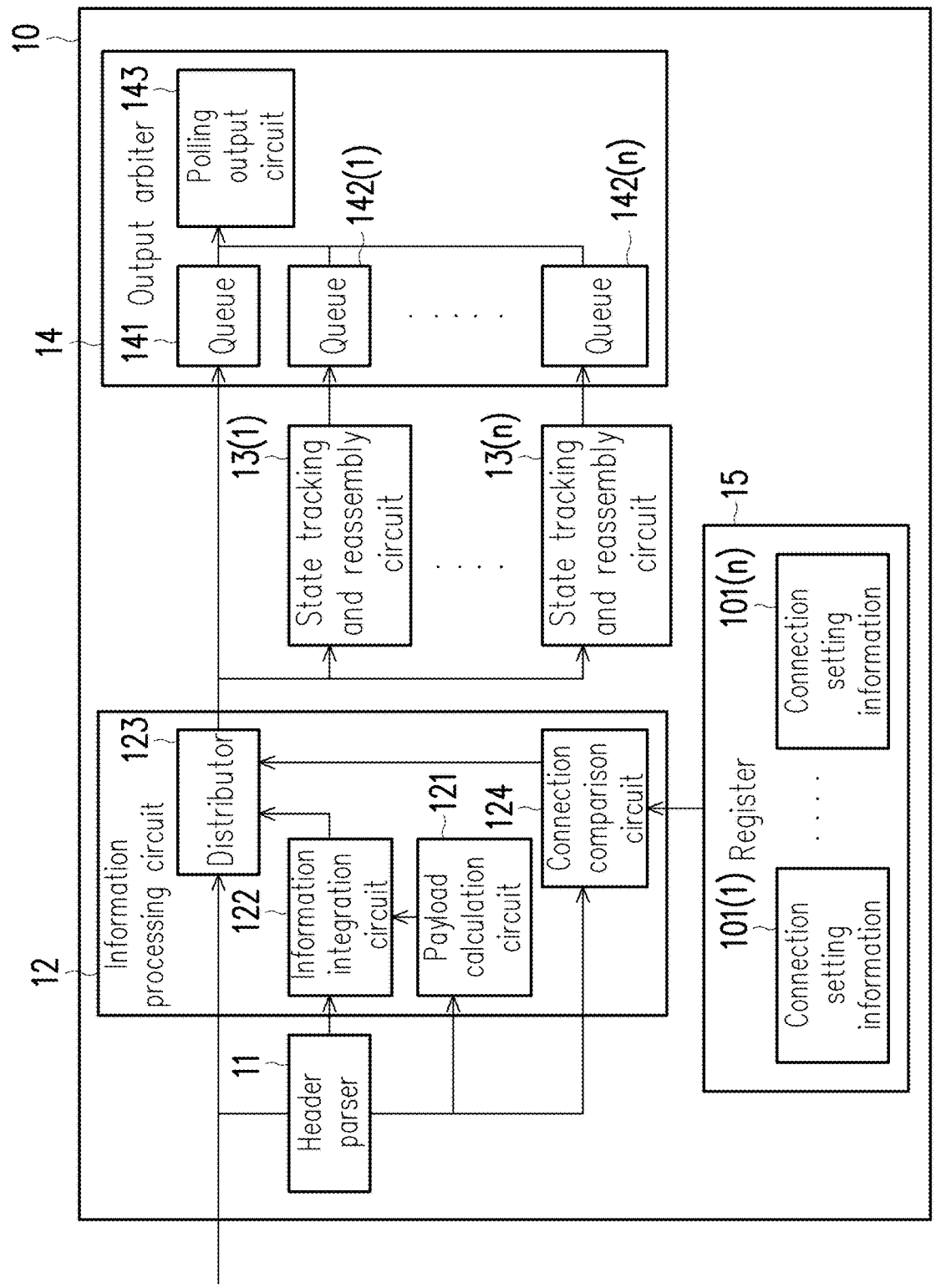
FIG. 1 is a schematic diagram of a packet sorting and reassembly circuit module according to an embodiment of the disclosure.

FIG. 1 is a schematic diagram of a packet sorting and reassembly circuit module according to an embodiment of the disclosure.

Please refer to FIG. 1. A packet sorting and reassembly circuit module 10 may be configured to retrieve and analyze multiple packet segments (also referred to as first packet segments) to obtain sideband information of the first packet segments. Then, the packet sorting and reassembly circuit module 10 may perform highly efficient reassembly and sort on the first packet segments according to the sideband information. Therefore, whether in system security protection or an online risk-control system, the packet sorting and reassembly circuit module 10 can improve the sorting and reassembly efficiency of the network packet on the premise of maintaining the high-speed transmission of the packets as much as possible to facilitate subsequent packet content retrieval.

In particular, the packet sorting and reassembly circuit module 10 is implemented in the form of hardware, for example, in a field programmable gate array (FPGA) chip based on an AXI4-Stream protocol. AXI is the abbreviation of Advanced eXtensible Interface. The AXI4-Stream protocol is an interface standard that enables two components to exchange data. The interface protocol connects a single master module for sending data to a single slave module.

Figure 2:
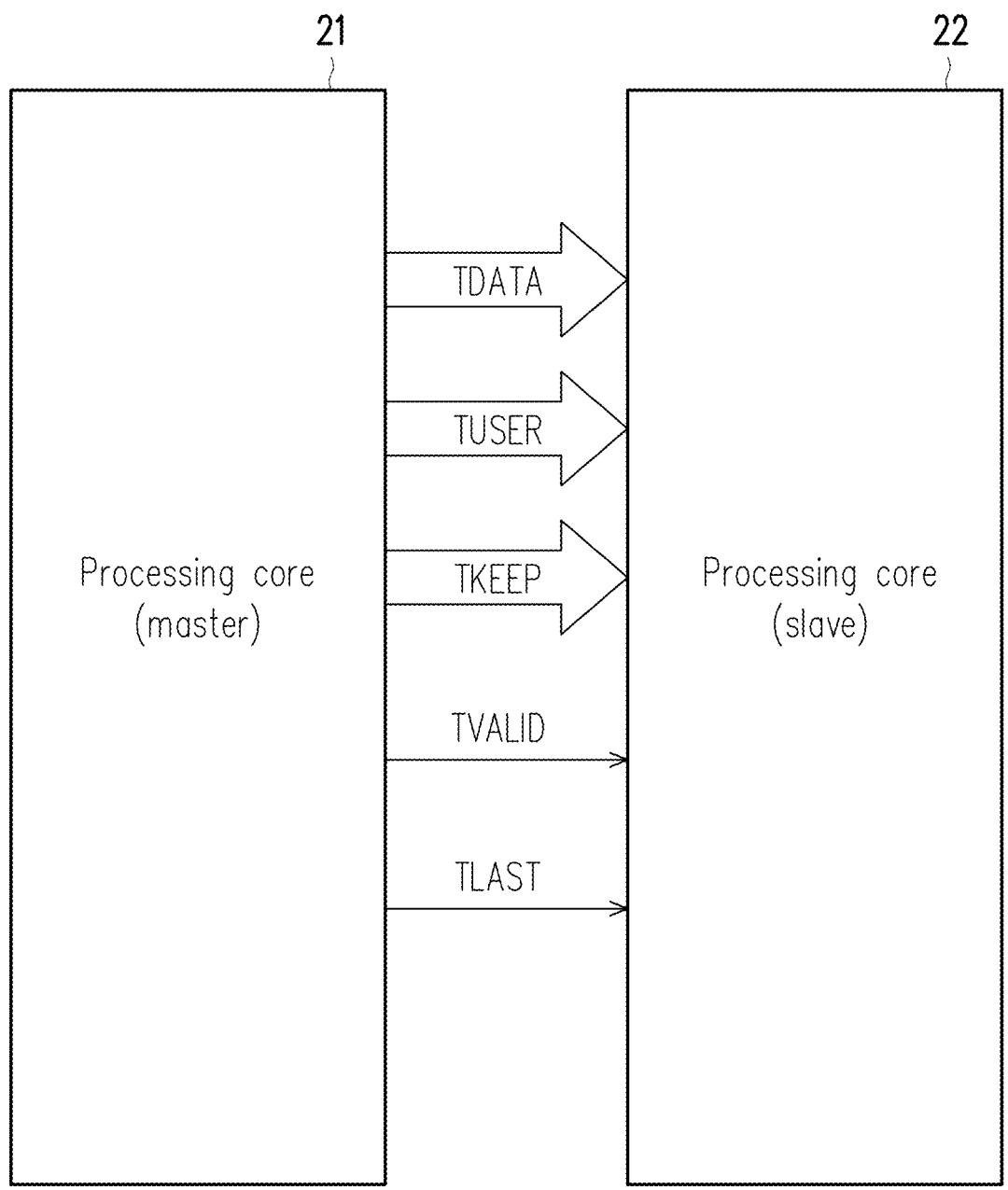
FIG. 2 is a schematic diagram of communication between multiple processing cores under an AXI4-Stream architecture according to an embodiment of the disclosure.

FIG. 2 is a schematic diagram of communication between multiple processing cores under an AXI4-Stream architecture according to an embodiment of the disclosure.

Please refer to FIG. 2. The AXI4-Stream architecture defines the communication specification between processing cores 21 and 22. The processing core 21 may be regarded as the master module for sending data, and the processing core 22 may be regarded as the slave module for receiving data. When packet data is transmitted between the processing cores 21 and 22 based on the AXI4-Stream protocol, the packet data is converted into a signal string, including signals TDATA, TKEEP, TUSER, TVALID, and TLAST for transmission. The signal TDATA is configured to transmit segmented packet data segments. The signal TKEEP is a byte qualifier of the signal TDATA, and the incremented signal from the low order bit to the high order bit indicates the length of data valid bits in the signal TDATA. The signal TUSER is the sideband information defined by a user. The signal TLAST indicates that a signal TDATA segment is the last segment of the packet. The signal TVALID reflects the validity of streaming data transmission. An example of using the AXI4-Stream protocol to transmit the packet data will be provided in the following content of the embodiment of the disclosure.

Please return to FIG. 1. The packet sorting and reassembly circuit module 10 may include a header parser 11, an information processing circuit 12, state tracking and reassembly circuits 13(1) to 13(*n*), and an output arbiter 14.

The header parser 11 is configured to analyze multiple first packet segments to obtain header information corresponding to a specific network packet (also referred to as the first network packet). For example, the first packet segments are obtained by disassembling the first network packet, and packet content of the first network packet may be restored through sorting and reassembly. In addition, the first network packet is transmitted based on the transmission control protocol (TCP) communication protocol.

Specifically, the header parser 11 may be configured to receive and parse the packet data (that is, the first packet segment) transmitted based on the AXI4-Stream protocol. For example, the header parser 11 may include a mealy finite state machine (mealy FSM) to retrieve the header information carried by the first packet segment. For example, the state machine may parse and retrieve media access control (MAC) header information, internet protocol (IP) header information, and TCP header information carried by the first packet segment one by one. After completing the retrieval of the header information, the header parser 11 may output the header information corresponding to the first network packet according to a parsing result.

Figure 3:
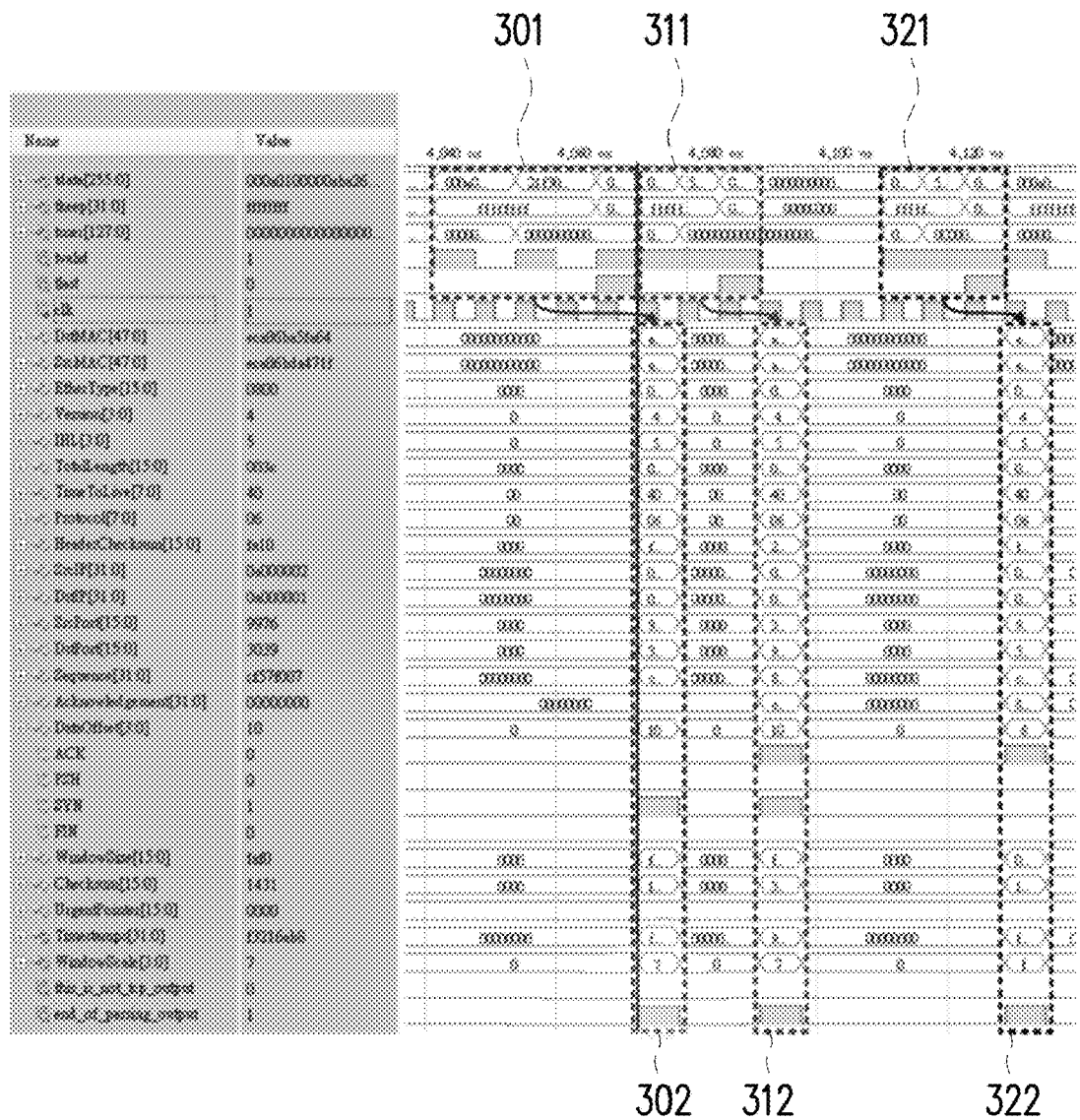
FIG. 3 is a schematic diagram of outputting header information by a header parser according to an embodiment of the disclosure.

FIG. 3 is a schematic diagram of outputting header information by a header parser according to an embodiment of the disclosure.

Please refer to FIG. 3. Signal strings 301, 311, and/or 321 entering the header parser 11 may transmit the packet data of the first packet segment based on the AXI4-Stream protocol. According to the signal strings 301, 311, and/or 321, the header parser 11 may take one clock cycle to generate the header information corresponding to the first network packet, as shown in FIG. 3. The header parser 11 may then output the header information (together with an output valid signal) through signal strings 302, 312, and/or 322.

Please return to FIG. 1. The information processing circuit 12 is coupled to the header parser 11 and the state tracking and reassembly circuits 13(1) to 13(*n*). The information processing circuit 12 may be configured to transmit the first packet segments and the sideband information corresponding to the first packet segments to the state tracking and reassembly circuit 13(*i*) (also referred to as a first state tracking and reassembly circuit) according to the header information, where i is between 1 and n.

Specifically, the information processing circuit 12 includes a payload calculation circuit 121, an information integration circuit 122, and a distributor 123. The payload calculation circuit 121 is coupled to the header parser 11. The payload calculation circuit 121 may be configured to receive the header information generated by the header parser 11 and calculate a packet data payload length corresponding to the first network packet according to the header information.

In an embodiment, the payload calculation circuit 121 may calculate the packet data payload length corresponding to the first network packet according to a header length (IHL) in the IP header information, a packet length (Total Length) in the IP header information, and a data offset (Data offset) in the TCP header information. For example, the payload calculation circuit 121 may obtain the packet data payload length (also referred to as TCP Segment Length) corresponding to the first network packet according to Equation (1.1) below.

TCP Segment Length=Total Length−4×(IHL+Data Offset)  (1.1)

Figure 4:
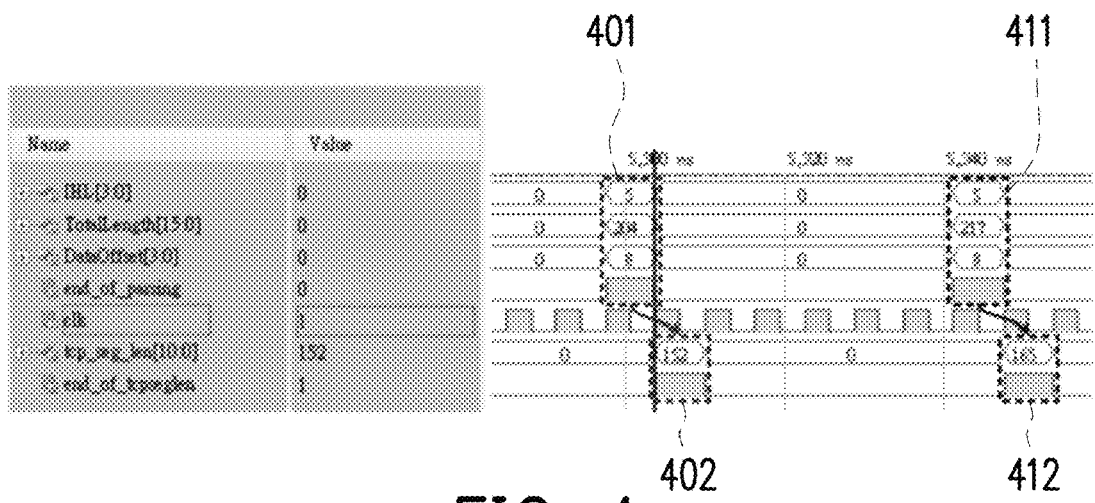
FIG. 4 is a schematic diagram of outputting a packet data payload length by a payload calculation circuit according to an embodiment of the disclosure.

FIG. 4 is a schematic diagram of outputting a packet data payload length by a payload calculation circuit according to an embodiment of the disclosure.

Please refer to FIG. 4. Signal strings 401 and/or 411 entering the payload calculation circuit 121 may transmit the header information from the header parser 11 based on the AXI4-Stream protocol. According to the signal strings 401 and/or 411, the payload calculation circuit 121 may take about one clock cycle to generate the packet data payload length corresponding to the first network packet, as shown in FIG. 4. The payload calculation circuit 121 may then output the packet data payload length (together with an output valid signal) through signal strings 402 and/or 412.

Please return to FIG. 1. The information integration circuit 122 is coupled to the header parser 11, the payload calculation circuit 121, and the distributor 123. The information integration circuit 122 may be configured to receive the packet data payload length generated by the payload calculation circuit 121, pack a part of the header information (also referred to as first partial information) from the header parser 11 into the sideband information corresponding to the first packet segments according to the packet data payload length, and transmit the packed sideband information to the distributor 123.

In an embodiment, the first partial information may include information of sequence number, time stamp, and time window size related to the sorting of the first network packet. The information is recorded in the header information of the original first network packet. In addition, the first partial information may also include other useful information in the header information, which is not limited in the disclosure. In an embodiment, the first partial information is packed into the sideband information and then transmitted to the distributor 123, so that the required first partial information may be synchronously entered into the distributor 123.

Figure 5:
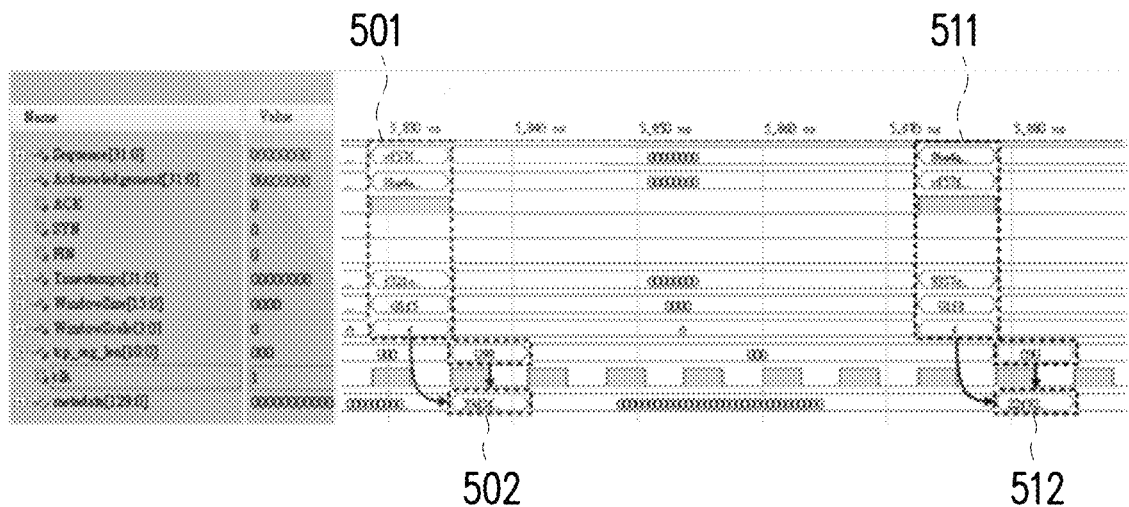
FIG. 5 is a schematic diagram of outputting sideband information corresponding to a first packet segment by an information integration circuit according to an embodiment of the disclosure.

FIG. 5 is a schematic diagram of outputting sideband information corresponding to a first packet segment by an information integration circuit according to an embodiment of the disclosure.

Please refer to FIG. 5. Signal strings 501 and/or 511 entering the information integration circuit 122 may transmit the header information (that is, the first partial information) from the header parser 11 and the packet data payload length from the payload calculation circuit 121 based on the AXI4-Stream protocol. According to the signal strings 501 and/or 511, the information integration circuit 122 may take about one clock cycle to generate the packed sideband information, as shown in FIG. 5. Then, the information integration circuit 122 may output the packed sideband information (together with an output valid signal) through signal strings 502 and/or 512.

Please return to FIG. 1. The distributor 123 is coupled to the information integration circuit 122 and the state tracking and reassembly circuits 13(1) to 13(*n*). The distributor 123 may receive the first packet segments and the packed sideband information from the information integration circuit 122. The distributor 123 may synchronously transmit the first packet segments and the sideband information to the state tracking and reassembly circuit 13(*i*).

In an embodiment, the information integration circuit 12 further includes a connection comparison circuit 124. The connection comparison circuit 124 is coupled to the header parser 11 and the distributor 123. The connection comparison circuit 124 is configured to compare another part of the header information (also referred to as second partial information) from the header parser 11 with connection setting information. Then, the comparison circuit 124 may transmit a path selection signal corresponding to the first packet segments to the distributor 123 according to a comparison result. The path selection signal may be configured to instruct the distributor 123 to transmit the first packet segments and the sideband information corresponding to the first packet segments to the state tracking and reassembly circuit 13(*i*) (that is, the first state tracking and reassembly circuit) corresponding to a specific packet processing channel (also referred to as a first packet processing channel). Therefore, after receiving the path selection signal from the connection comparison circuit 124, the distributor 123 may transmit the first packet segments and the sideband information to the state tracking and reassembly circuit 13(*i*) according to the path selection signal.

In an embodiment, the second partial information may include information of IP address and port related to the first network packet, such as information of source IP address, destination IP address, source port, and destination port associated with the first network packet. In addition, the second partial information may also include other useful information in the header, which is not limited to the disclosure.

In an embodiment, the packet sorting and reassembly circuit module 10 further includes a register 15. The register 15 is coupled to the connection comparison circuit 124. The register 15 may be configured to store connection setting information 101(1) to 101(*n*). The connection setting information 101(*i*) stores the connection setting information related to the first packet processing channel. For example, the connection setting information 101(*i*) may store information of source IP address, destination IP address, source port, and destination port related to the first packet processing channel. The connection setting information corresponding to different packet processing channels is different. In addition, the total number of the connection setting information 101(1) to 101(*n*) coincides with the total number (that is, n) of available packet processing channels.

In an embodiment, the connection comparison circuit 124 may compare the second partial information with the connection setting information 101(1) to 101(*n*), for example, respectively compare the source IP address, the destination IP address, the source port, and/or the destination port related to the first network packet in the second partial information with the source IP address, the destination IP address, the source port, and/or the destination port in the connection setting information 101(*i*). If the comparison results coincide, the connection comparison circuit 124 may transmit the path selection signal corresponding to the first packet processing channel to the distributor 123. Then, the distributor 123 may transmit the first packet segments and the sideband information to the state tracking and reassembly circuit 13(*i*) according to the path selection signal. The state tracking and reassembly circuit 13(*i*) may be responsible for executing the reassembly and sorting of the packet segments transmitted based on the first packet processing channel. On the other hand, if the comparison results do not coincide, the connection comparison circuit 124 may transmit the result of the comparison failure to the distributor 123. The distributor 123 may skip the state tracking and reassembly circuits 13(1) to 13(*n*) according to the result of the comparison failure and directly transmit the first packet segments to the output arbiter 14.

Figure 6:
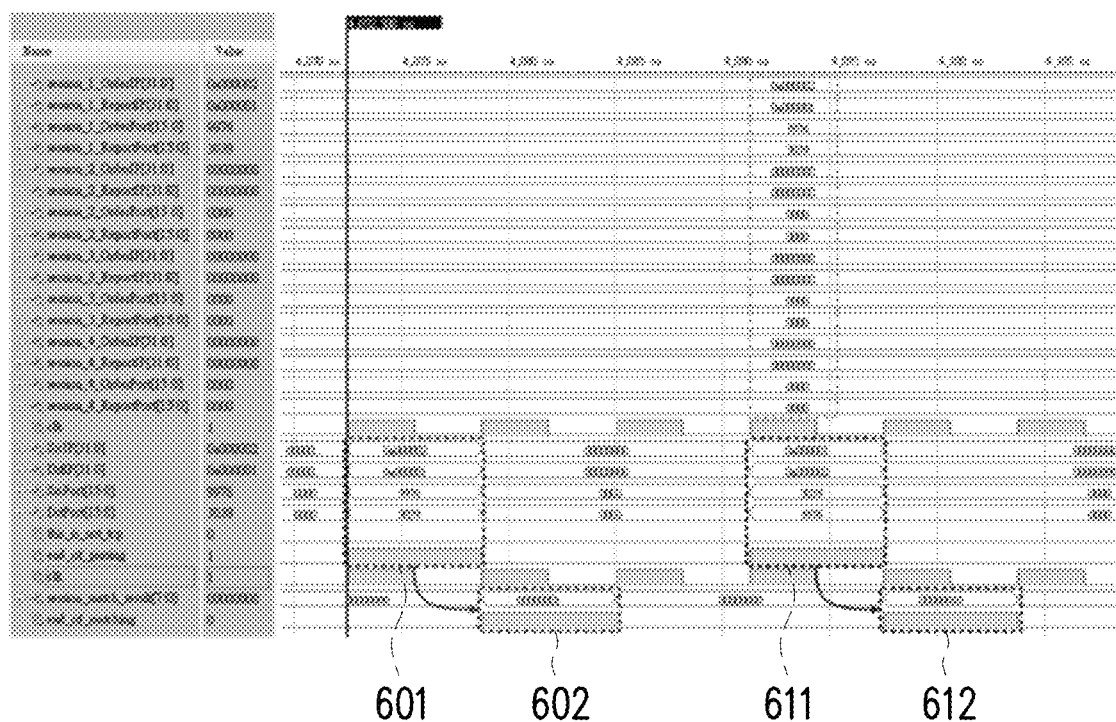
FIG. 6 is a schematic diagram of outputting a path selection signal by a connection comparison circuit according to an embodiment of the disclosure.

FIG. 6 is a schematic diagram of outputting a path selection signal by a connection comparison circuit according to an embodiment of the disclosure.

Please refer to FIG. 6. Signal strings 601 and/or 611 entering the connection comparison circuit 124 may transmit the header information (that is, the second partial information) from the header parser 11 and the connection setting information 101(*i*) from the register 15 based on the AXI4-Stream protocol. According to the signal strings 601 and/or 611, the connection comparison circuit 124 may take about one clock cycle to generate a comparison result (for example, the path selection signal or a comparison failure signal), as shown in FIG. 6. Then, the connection comparison circuit 124 may output the comparison result (together with an output valid signal) through signal strings 602 and/or 612.

Figure 7:
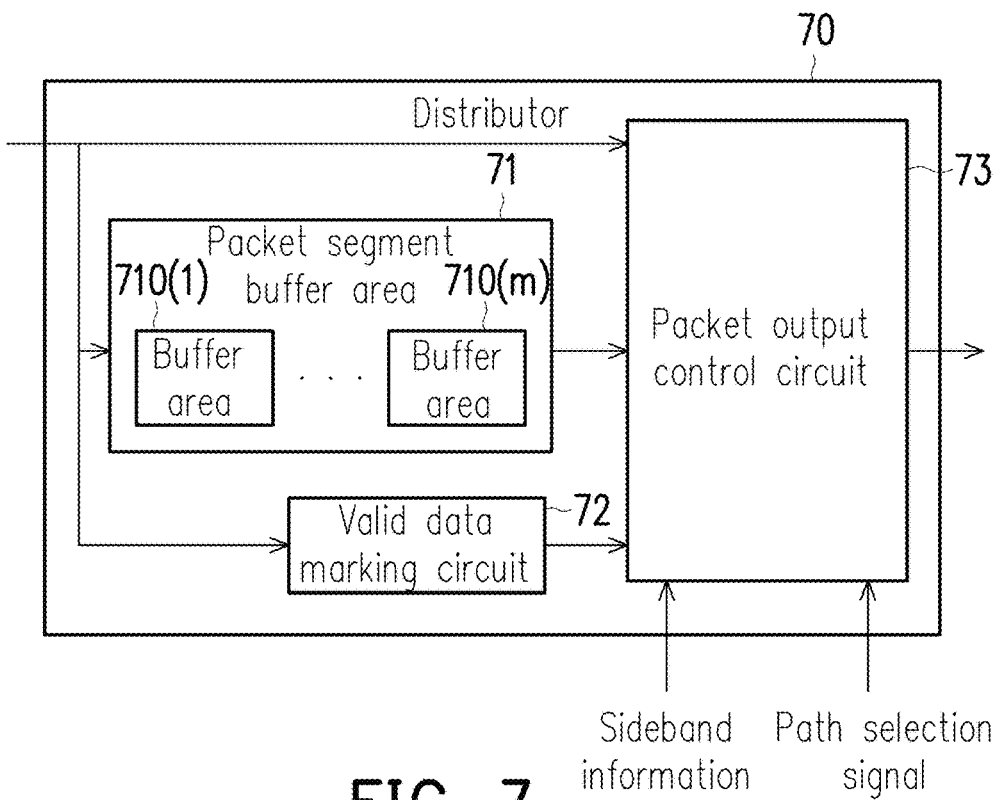
FIG. 7 is a schematic diagram of a distributor according to an embodiment of the disclosure.

FIG. 7 is a schematic diagram of a distributor according to an embodiment of the disclosure.

Please refer to FIG. 7. The distributor 123 of FIG. 1 may include a distributor 70. The distributor 70 may consist of a packet segment buffer area 71, a valid data marking circuit 72, and a packet output control circuit 73.

The packet segment buffer area 71 may include multiple buffer areas 710(1) to 710(*m*). The packet segment buffer area 71 may store the received first packet segment in at least one of the buffer areas 710(1) to 710(*m*), such as the buffer area 710(*j*). At the same time, the valid data marking circuit 72 may generate a valid data marking corresponding to the buffer area 710(*j*) to indicate that the first packet segment is stored in the buffer area 710(*j*). After receiving the sideband information corresponding to the first packet segment from the information integration circuit 122 and the path selection signal corresponding to the first packet segment from the connection comparison point circuit 124, the packet output control circuit 73 may read the first packet segment from the buffer area 710(j) and transmit the first packet segment together with the sideband information to the state tracking and reassembly circuit 13(i) according to the valid data marking, the sideband information, and the path selection signal.

Figure 8:
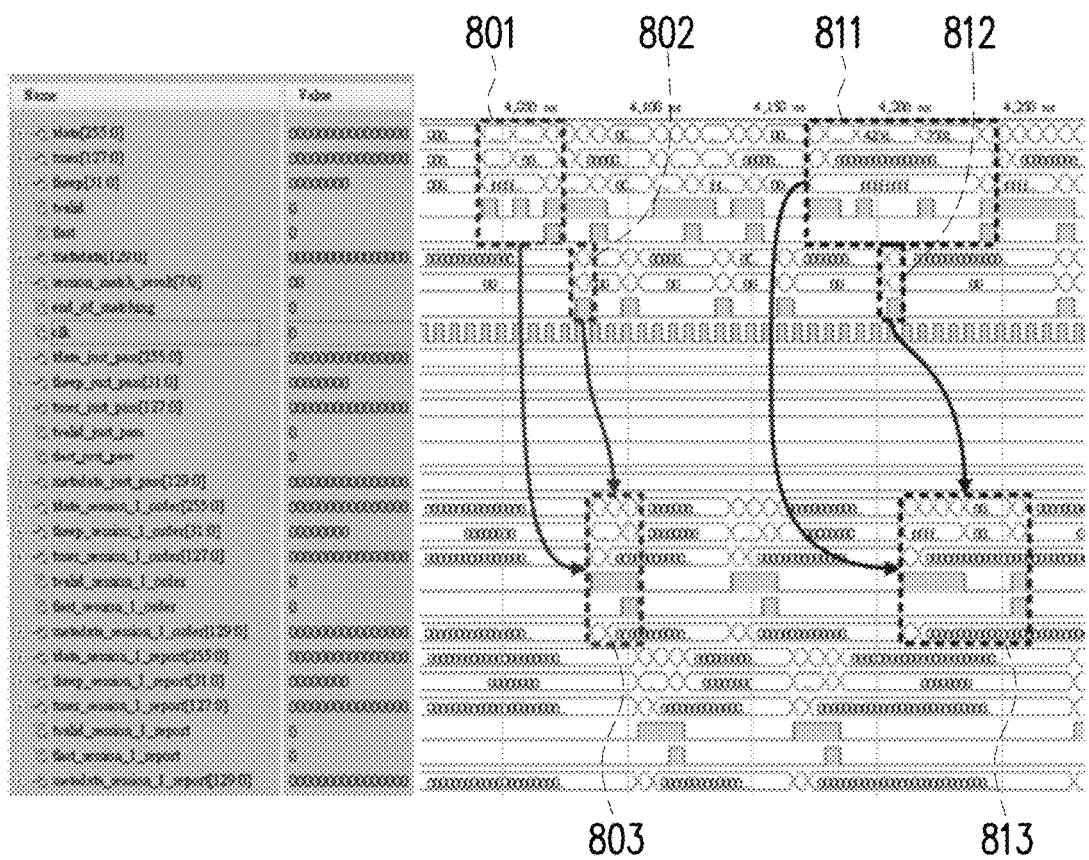
FIG. 8 is a schematic diagram of outputting a first packet segment and sideband information by a distributor according to an embodiment of the disclosure.

FIG. 8 is a schematic diagram of outputting a first packet segment and sideband information by a distributor according to an embodiment of the disclosure.

Please refer to FIG. 8. Signal strings 801 and/or 811 entering the distributor 70 may transmit the packet data of the first packet segment based on the AXI4-Stream protocol, and signal strings 802 and/or 812 entering the distributor 70 may transmit the sideband information and the path selection signal corresponding to the first packet segment based on the AXI4-Stream protocol. According to the signal strings 801 and 802 and/or 811 and 812, the distributor 70 may take about two to five clock cycles to output the first packet segment and the corresponding sideband information (together with an output valid signal) to a specific packet processing path (for example, a first packet processing path) through signal strings 803 and/or 813.

Please return to FIG. 1. The state tracking and reassembly circuits 13(1) to 13(n) are coupled to the information processing circuit 12 and the output arbiter 14. The total number of the state tracking and reassembly circuits 13(1) to 13(n) coincides with the total number (that is, n) of available packet processing channels. In addition, the user may customize the total number (that is, n) of available packet processing channels.

The state tracking and reassembly circuit 13(i) may be configured to receive the first packet segments and the sideband information corresponding to the first packet segments from the information processing circuit 12 (or the distributor 123). The state tracking and reassembly circuit 13(i) may reassemble and sort the first packet segments according to the sideband information. For example, the state tracking and reassembly circuit 13(i) may temporarily store the first packet segments and reassemble the first packet segments. Then, the state tracking and reassembly circuit 13(i) may sort the reassembled first packet segments and remaining packet segments (that is, packet segments not belonging to the first network packet) according to the sideband information.

Figure 9:
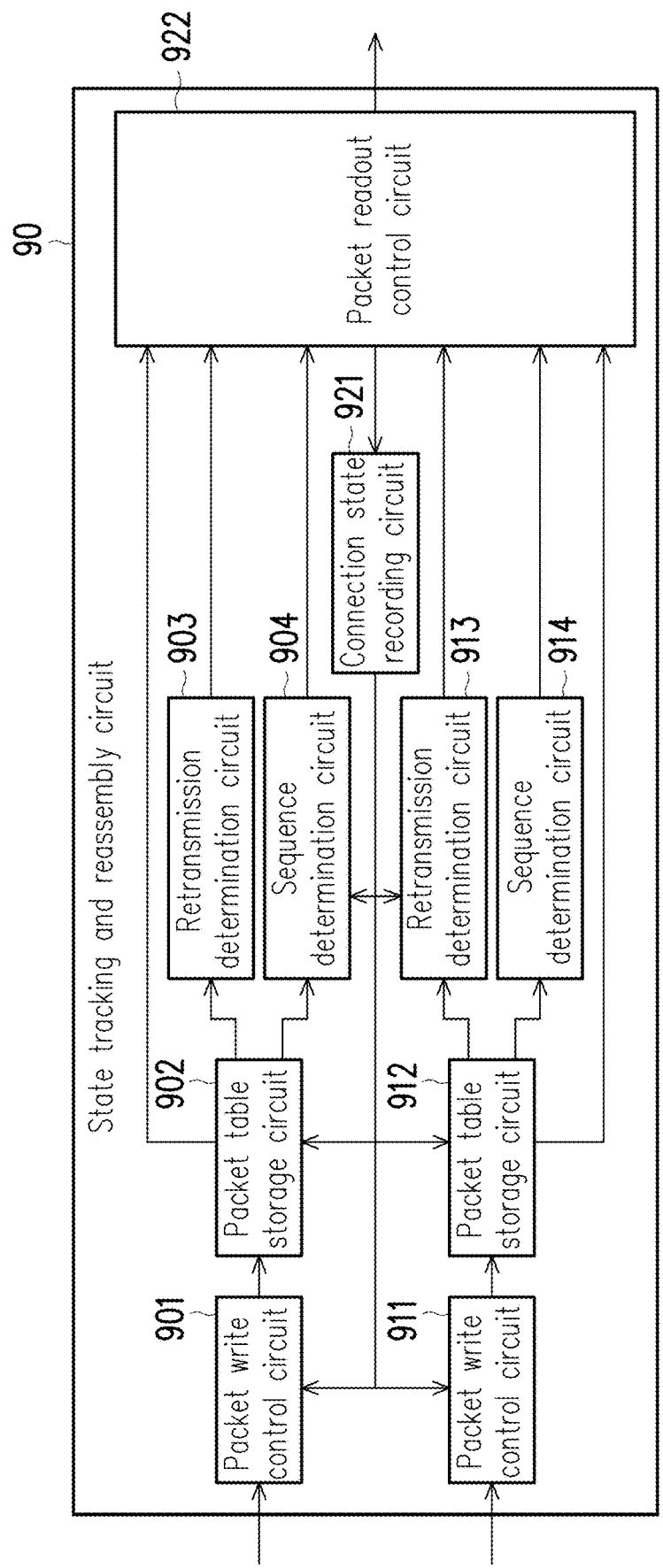
FIG. 9 is a schematic diagram of a state tracking and reassembly circuit according to an embodiment of the disclosure.

FIG. 9 is a schematic diagram of a state tracking and reassembly circuit according to an embodiment of the disclosure.

Please refer to FIG. 9. The state tracking and reassembly circuit 13(i) of FIG. 1 may include a state tracking and reassembly circuit 90. The state tracking and reassembly circuit 90 may include a packet write control circuit 901, a packet table storage circuit 902, a retransmission determination circuit 903, a sequence determination circuit 904, a connection state recording circuit 921, and a packet readout control circuit 922.

The packet write control circuit 901 may be configured to receive and temporarily store the first packet segments. The packet table storage circuit 902 may be configured to receive and temporarily store the sideband information corresponding to the first packet segments. The retransmission determination circuit 903 may determine whether the first network packet corresponding to the first packet segments is a retransmission packet according to the sideband information. The sequence determination circuit 904 may reassemble and sort the first packet segments according to the sideband information. The retransmission packet refers to a network packet that has been sent before and carries duplicate content. The connection state recording circuit 921 is configured to record a connection state of the packet processing channel that the state tracking and reassembly circuit 90 is responsible for. The packet readout control circuit 922 is configured to send out the packet segments after completing reassembly and sorting.

In an embodiment, if the retransmission determination circuit 903 determines that the first network packet is not a retransmission packet, the packet readout control circuit 922 may transmit the reassembled first packet segments to the output arbiter 14 according to a sorting result. However, if the retransmission determination circuit 903 determines that the first network packet is a retransmission packet, the packet readout control circuit 922 may generate a retransmission identification signal corresponding to the first network packet. The retransmission identification signal may be sent out along with the first packet segments and configured to inform the next device or node that the first network packet is a retransmission packet.

FIG. 10 shows pseudo codes of multiple algorithms for sorting, sending out, and retransmitting a network packet according to an embodiment of the disclosure. FIG. 11 shows names and descriptions of variables adopted in the pseudo-codes of the algorithms shown in FIG. 10 according to an embodiment of the disclosure.

Please refer to FIG. 10 and FIG. 11, Algorithm A presents a dummy code that sorts and transmits TCP packets from a client-side to a server. Algorithm B presents a dummy code that sorts and transmits TCP packets from the server to the client side. Algorithm C presents a dummy code that transmits a retransmission packet from the client side to the server. Algorithm D presents a dummy code that transmits the retransmission packet from the server to the client side. Algorithms A and B may be executed by the sequence determination circuit 904 of FIG. 9. Algorithms C and D may be executed by the retransmission determination circuit 903 of FIG. 9.

It should be noted that some variables used in Algorithms A to D are default values. However, some parameters (such as sequence number, time stamp, time window size, etc.) may be obtained from the sideband information corresponding to the first packet segment. In addition, Algorithms A to D are only examples and are not used to limit the disclosure. Algorithms A to D may still be adjusted according to practical requirements.

Please return to FIG. 9. In an embodiment, the state tracking and reassembly circuit 90 may further include a packet write control circuit 911, a packet table storage circuit 912, a retransmission determination circuit 913, and a sequence determination circuit 914. The packet write control circuit 911, the packet table storage circuit 912, the retransmission determination circuit 913, and the sequence determination circuit 914 are respectively the same as or similar to the packet write control circuit 901, the packet table storage circuit 902, the retransmission determination circuit 903, and the sequence determination circuit 904.

In an embodiment, the packet write control circuit 901, the packet table storage circuit 902, the retransmission determination circuit 903, and the sequence determination circuit 904 may be configured to process a specific type of network packets (also referred to as first type network packets). The packet write control circuit 911, the packet table storage circuit 912, the retransmission determination circuit 913, and the sequence determination circuit 914 may be configured to process another type of network packets (also referred to as second type network packets). The first type network packet is, for example, an order packet in the risk-control system. The second type network packet is, for example, a return packet in the risk-control system. In an embodiment, for the same connection (for example, a TCP connection), the order packet and the return packet transmitted through the connection may be processed through different sub-paths in the state tracking and reassembly circuit 90, as shown in FIG. 9. In addition, in an embodiment, the state tracking and reassembly circuit 90 may not include the packet write control circuit 911, the packet table storage circuit 912, the retransmission determination circuit 913, and the sequence determination circuit 914.

Please return to FIG. 1. The output arbiter 14 may be configured to output the first packet segments according to the sorting result of the first packet segments by the state tracking and reassembly circuit 13(*i*). For example, the output arbiter 14 may include queues 141 and 142(1) to 142(*n*) and a polling output circuit 143. An input terminal of the queue 141 is coupled to the information processing circuit 12 (for example, the distributor 123). Input terminals of the queues 142(1) to 142(*n*) are respectively coupled to output terminals of the state tracking and reassembly circuits 13(1) to 13(*n*). Output terminals of the queues 141 and 142(1) to 142(*n*) are all coupled to the polling output circuit 143.

In an embodiment, the state tracking and reassembly circuit 13(*i*) may transmit the first packet segments after completing reassembly and sorting to the queue 142(*i*) according to the sorting result. The polling output circuit 143 may send out the first packet segments from the queue 142(*i*) through a polling manner. In an embodiment, the queues 142(1) to 142(*n*) are also referred to as first queues.

On the other hand, for a network packet (also referred to as a second network packet) that does not need to be processed through the n packet processing channels, the information processing circuit 12 (or the distributor 123) may not transmit multiple packet segments (also referred to as second packet segments) corresponding to the second network packet to the queue 141 through the state tracking and reassembly circuits 13(1) to 13(*n*). The polling output circuit 143 may also send out the second packet segments from the queue 141 through a polling manner. In an embodiment, the queue 141 is also referred to as a second queue.

In summary, taking the packet sorting and reassembly circuit module 10 used in the risk-control system as an example, the user may preset n connections (that is, TCP connections) for transmitting the order packet and the return packet in the risk-control system. Each connection corresponds to one packet processing channel in the packet sorting and reassembly circuit module 10, and each of the state tracking and reassembly circuits 13(1) to 13(*n*) is responsible for one packet processing channel.

After activating the packet sorting and reassembly circuit module 10, if the packet segments (that is, the first packet segments) of the currently received network packet belong to the order packet or the return packet in the risk-control system, the first packet segments may be transmitted to the state tracking and reassembly circuit 13(*i*) for random number reassembly and sorting are according to the corresponding connection setting information 101(*i*). The first packet segment, after completing reassembly and sorting, may be transmitted to the queue 142(*i*) to wait to be sent out (for example, to the client side or the server in the risk-control system). The packet content is parsed and verified (for example, to determine whether a transaction behavior corresponding to the network packet is illegal or a high-risk behavior according to the packet content). In this way, on the premise of maintaining the high-speed transmission of packets as much as possible, the sorting and reassembly efficiency of the network packet can be improved to facilitate subsequent packet content retrieval.

In addition, if the currently received network packet is determined to be a retransmission packet, a retransmission identification signal may be sent along with the packet segment to inform the next device or node that the network packet is a retransmission packet. Afterwards, according to the retransmission identification signal, the risk-control system may directly skip the network packet to prevent executing duplicated transaction behaviors.

On the other hand, if the packet segments (that is, the second packet segments) of the currently received network packet do not belong to the order packet or the return packet in the risk-control system, the second packet segments may skip the state tracking and reassembly circuits 13(1) to 13(*n*) to be directly transmitted to the queue 141 to wait to be sent out. In this way, the number of packets that need to be temporarily stored and processed can be effectively reduced.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A packet sorting and reassembly circuit module, comprising:
   a header parser;
   an information processing circuit, coupled to the header parser;
   at least one state tracking and reassembly circuit, coupled to the information processing circuit; and
   an output arbiter, coupled to the at least one state tracking and reassembly circuit, wherein
   the header parser is configured to analyze a plurality of first packet segments to obtain header information corresponding to a first network packet, wherein the first network packet is transmitted based on a transmission control protocol (TCP) communication protocol,
   the information processing circuit is configured to transmit the first packet segments and sideband information corresponding to the first packet segments to a first state tracking and reassembly circuit among the at least one state tracking and reassembly circuit according to the header information,
   the first state tracking and reassembly circuit is configured to reassemble and sort the first packet segments according to the sideband information, and
   the output arbiter is configured to output the first packet segments according to a sorting result,
   wherein the information processing circuit comprises:
   an information integration circuit, coupled to the header parser;
   a payload calculation circuit, coupled to the header parser and the information integration circuit; and
   a distributor, coupled to the information integration circuit and the at least one state tracking and reassembly circuit, wherein
   the payload calculation circuit is configured to calculate a packet data payload length corresponding to the first network packet according to the header information,
   the information integration circuit is configured to pack first partial information in the header information into the sideband information according to the packet data payload length and transmit the sideband information to the distributor, and the distributor is configured to transmit the first packet segments and the sideband information to the first state tracking and reassembly circuit.

2. The packet sorting and reassembly circuit module according to claim 1, wherein the first partial information comprises information of sequence number, time stamp, and time window size related to sorting of the first network packet.

3. The packet sorting and reassembly circuit module according to claim 1, wherein the information processing circuit further comprises:

a connection comparison circuit, coupled to the header parser and the distributor, wherein the connection comparison circuit is configured to compare second partial information in the header information with connection setting information, and transmit a path selection signal corresponding to the first packet segments to the distributor according to a comparison result, and the distributor is further configured to transmit the first packet segments and the sideband information to the first state tracking and reassembly circuit according to the path selection signal.

4. The packet sorting and reassembly circuit module according to claim 3, wherein the second partial information comprises information of internet protocol address and port related to the first network packet.

5. The packet sorting and reassembly circuit module according to claim 3, further comprising:

a register, coupled to the connection comparison circuit, wherein the register is configured to store the connection setting information.

6. The packet sorting and reassembly circuit module according to claim 1, wherein the first state tracking and reassembly circuit is configured to temporarily store the first packet segments, reassemble the first packet segments, and sort the reassembled first packet segments and remaining packet segments according to the sideband information.

7. The packet sorting and reassembly circuit module according to claim 1, wherein the output arbiter comprises:

at least one queue, coupled to the at least one state tracking and reassembly circuit; and a polling output circuit, coupled to the at least one queue, wherein the first state tracking and reassembly circuit is configured to transmit the first packet segments to a first queue among the at least one queue according to the sorting result, and the polling output circuit is configured to send out the first packet segments from the first queue.

8. The packet sorting and reassembly circuit module according to claim 7, wherein the at least one queue further comprises a second queue, the second queue is coupled to the distributor, the distributor is further configured to transmit a plurality of second packet segments corresponding to a second network packet to the second queue without going through the at least one state tracking and reassembly circuit, and the polling output circuit is further configured to send out the second packet segments from the second queue.

9. The packet sorting and reassembly circuit module according to claim 1, wherein the first state tracking and reassembly circuit is further configured to determine whether the first network packet is a retransmission packet according to the sideband information, and when the first network packet is the retransmission packet, the first state tracking and reassembly circuit is further configured to generate a retransmission identification signal corresponding to the first network packet.

10. The packet sorting and reassembly circuit module according to claim 1, wherein the packet sorting and reassembly circuit module is implemented based on an AXI4-Stream protocol.

\* \* \* \* \*